Jan. 26, 1932.   G. AJDUKOVICH   1,843,090

DUAL CONTROL FOR VEHICLES

Filed Jan. 28, 1931

Inventor
G. Ajdukovich

By
Attorneys

Patented Jan. 26, 1932

1,843,090

UNITED STATES PATENT OFFICE

GEORGE AJDUKOVICH, OF ST. LOUIS, MISSOURI

DUAL CONTROL FOR VEHICLES

Application filed January 28, 1931. Serial No. 511,872.

This invention relates to improvements in dual controls for vehicles, and while hereinafter described with relation to its application to automobiles, it will of course be understood that it is equally applicable to motorboats, aeroplanes, and the like.

Before going into a statement of the objects of the invention and the embodiment thereof, and in order to outline more clearly the nature of the invention, it may be stated that in driving automobiles, particularly on long trips, the driver frequently becomes tired and cramped by retaining his right foot on the accelerator pedal. The present invention provides an auxiliary accelerator pedal at the left whereby the driver may shift to the other foot whenever he so desires, and with a feeling of security and safety. Heretofore dual or two accelerator pedals have been used, but these have been open to the objection that often, in a case of emergency, the driver would inadvertently fail to remove his foot from the left accelerator while putting on the brake with his right foot, such failure, in many instances, resulting in serious accidents and damage to the machine. Therefore the present invention is directed primarily to a dual accelerator control provided with safety features whereby accidents such as above outlined are impossible.

A further object of the invention is to provide a simple and practical mechanism which may be installed on cars now in use without material alteration or change in existing parts.

A further object is to provide a safe and reliable mechanism of the above character which may be inexpensively manufactured and assembled.

Other objects will be in part obvious from annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as a part of this disclosure, and in such drawings like characters of reference denote corresponding parts throughout all of the views, in which—

Figure 2:
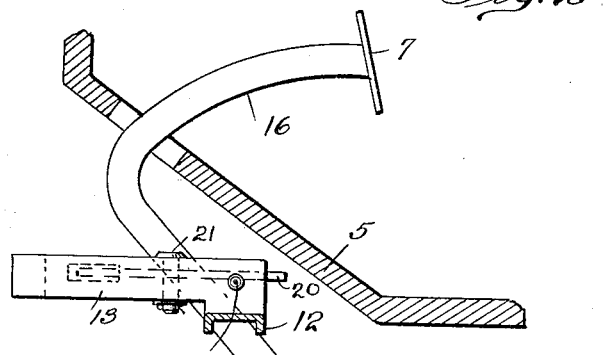
Fig. 2 is a detail vertical sectional view showing the location of the device with respect to the pedal and floor board.
Figure 1:
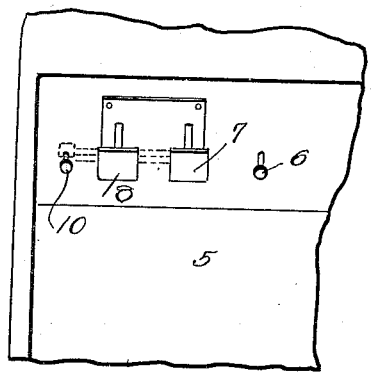
Fig. 1 is a plan view of the floor board of an automobile or motor-boat, showing the relative location of the parts.

Referring now to the drawings in detail, and more particularly to Fig. 1, 5 indicates the floor board of a vehicle provided with the usual accelerator pedal 6 at the right, a brake pedal 7, a clutch pedal 8, and the auxiliary accelerator pedal 10 at the left of the clutch pedal. In Fig. 2 it will be noted that the device in question comprises a rectangular elongated member or casting 12 mounted beneath the floor board 5 in relatively fixed position in any desired manner as, for example, by securing it to a part of the transverse frame of the machine (not shown). This part 12 carries at one end a right angle portion 13 and at the left the auxiliary accelerator button 10 mounted at the upper end of a shaft or stem 14 passing through a casing 15 at the left hand end of the body portion 12.

Figure 3:
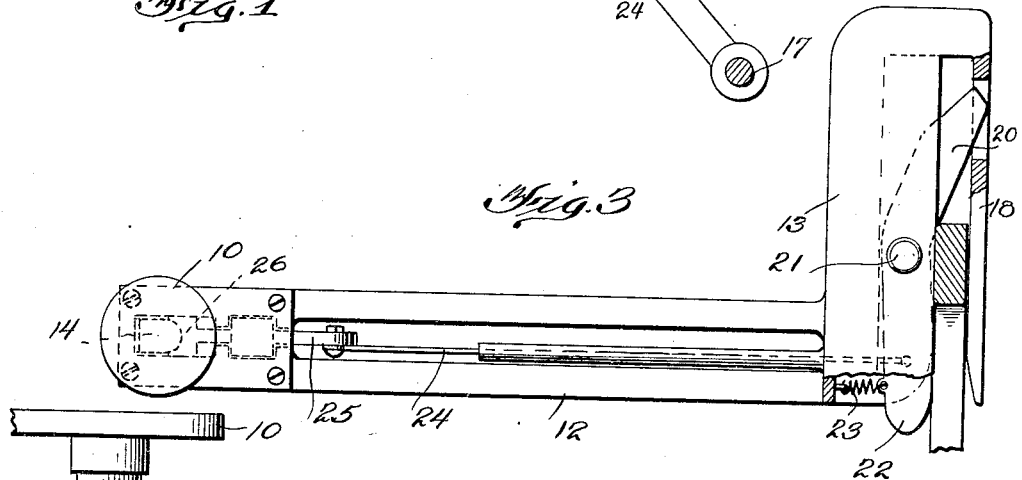
Fig. 3 is a detail plan view, partly in section, of the complete device.

The brake pedal 7 is mounted at the end of the usual pedal arm 16 which is shown diagrammatically, and the lower end of this arm is connected to the usual rock shaft 17. This arm slides back and forth in a guide slot 18 in the part 13 as shown in Fig. 3, and is adapted to cooperate with a bent lever 20 pivoted at 21 in the casting. Thus, as the pedal moves forwardly, it engages the bent arm of the lever 20 causing its opposite end 22 to swing towards the right, Fig. 3, thereby placing a return spring 23 under tension.

Figure 4:
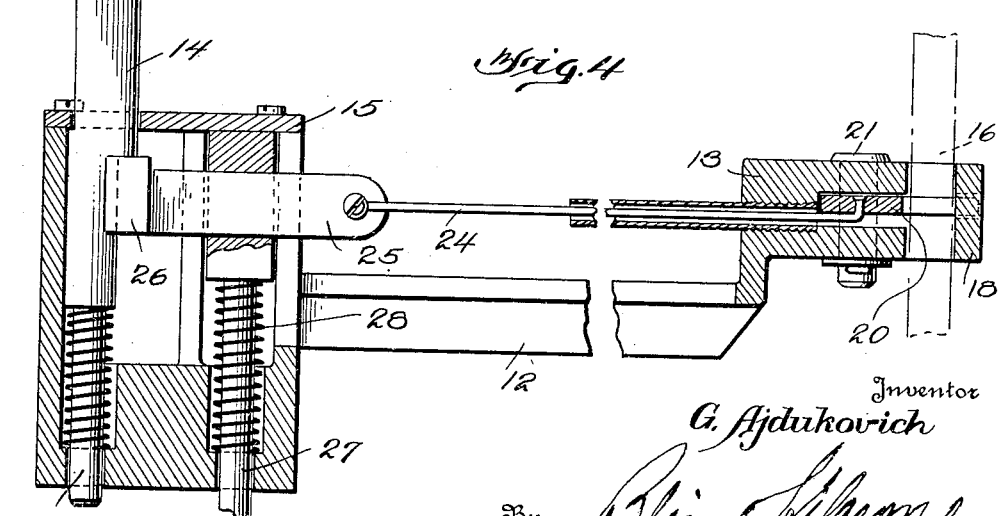
Fig. 4 is a detail longitudinal sectional vertical view of the parts shown in Fig. 3.

A flexible wire 24 leads from this arm 22 to a laterally sliding block or member 25 as shown in Fig. 4 and moves the same relatively to a notch or shoulder 26 in the pedal stem 14. This member 25 constitutes a connecting safety link between the pedal stem 14 and engine speed control stem 27 which is connected in any desired manner with the gas supply. Return springs 28 are associated with both stems 14 and 27 so as to insure their return movement to normal position as shown.

While it is believed that the operation will be clear from the above description, nevertheless a brief statement is appended. Assuming the operator to be driving the car with his left foot upon the auxiliary accelerator button 10. A depression of this button 10 transmits the force from the shoulder 26 to the slidable member 25 and thereby depresses the stem 26 allowing more gas to feed to the engine. Upon removal of his foot from the pedal 10, both vertically moving parts return to normal position as shown in Fig. 4. However, should an emergency arise, where the driver desires to quickly apply the brakes as by pressing pedal 7, and he forgets or fails to remove his foot from the button 10, the pedal arm 16 moves forward and engages the bent arm 20, exerting a pull upon the wire 24 which moves the safety slide 25 out of engagement with the shoulder 26. The return spring 28 associated with the stem 27 immediately forces these parts upwardly to release position, thereby shutting off the gas and bringing the engine to an idling speed. When the foot pedal 10 is subsequently released, then its spring 28 returns the stem 14 to normal position and the return spring 23 associated with the arm 22 restores the safety slide 25 to its proper position beneath the shoulder 26.

From the above, it will be clear that the present invention contemplates the desired dual control for driving motor vehicles, as well as a safety device automatically shutting off the engine if the operator fails to remove his foot from the accelerator pedal while applying the brakes.

The invention is of simple and practical construction having few parts which may be inexpensively manufactured, assembled, and installed on vehicles now in use without material change. The invention is therefore well adapted to accomplish among others all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In combination with the usual brake control pedal of a motor vehicle, an auxiliary accelerator pedal separate from the control pedal, and means associated with the first mentioned pedal for disconnecting the auxiliary accelerator pedal when said first-mentioned pedal is actuated.

2. In combination with a foot brake pedal, a separately mounted auxiliary accelerator pedal adapted to control the speed of the engine, and means for disconnecting said auxiliary pedal from the engine control when the brake pedal is actuated.

3. In combination with a foot brake pedal, a separately mounted auxiliary accelerator pedal for controlling the speed of the engine, means for disconnecting the auxiliary pedal from the engine control when the brake pedal is actuated, and means for reconnecting the auxiliary accelerator pedal with the engine control when the brake pedal and auxiliary accelerator pedal are returned to normal position.

4. In combination with the usual pedal controls of a motor vehicle including a brake pedal, an auxiliary accelerator pedal at the left thereof, means connecting said accelerator pedal with the engine control, and means adapted to be actuated by the foot brake pedal for disconnecting the auxiliary accelerator pedal from the engine control, said means including a member adapted to be engaged by the brake pedal, and a slidable member connecting the accelerator pedal and engine control adapted to be moved when said brake engages said first-mentioned means.

5. In combination with the usual pedal control of a motor vehicle including a brake pedal, an auxiliary accelerator pedal at the left thereof, means connecting said accelerator pedal with the engine control, means adapted to be actuated by the foot pedal for disconnecting the auxiliary accelerator pedal from the engine control, said means including a member adapted to be engaged by the brake pedal, a slidable member connecting the accelerator pedal and engine control adapted to be moved when said brake pedal engages said first-mentioned means, and spring means for returning said parts to normal position and reconnecting the auxiliary pedal with the engine control mechanism.

6. A member adapted to be attached to a motor vehicle provided with a brake pedal, comprising a supporting body having an auxiliary accelerator pedal at one end and a lever at the opposite end adapted to be engaged by a brake pedal, connections between the auxiliary accelerator pedal and the engine control mechanism, and means for interrupting this connection when said first-mentioned means is actuated on depression of the brake pedal.

7. A member adapted to be attached to a motor vehicle provided with a brake pedal, comprising a supporting body having an auxiliary accelerator pedal at one end and a lever at the opposite end adapted to be engaged by a brake pedal, connections between the auxiliary accelerator pedal and the engine control mechanisms, means for interrupting this connection when said first-mentioned means is actuated on depression of the brake pedal, and means for returning the parts to normal position and reconnecting the auxiliary accelerator pedal with the engine control mechanism when pressure upon the brake pedal and auxiliary accelerator pedal is removed.

Signed at Washington, this 27th day of January, 1931.

GEORGE AJDUKOVICH.